(12) United States Patent
Holzer et al.

(10) Patent No.: US 12,522,705 B2
(45) Date of Patent: Jan. 13, 2026

(54) FLEXIBLE MULTILAYER FILM HAVING HIGH LOW-TEMPERATURE IMPACT STRENGTH FOR MEDICAL PACKAGES

(71) Applicant: PolyCine GmbH, Schiffweiler (DE)

(72) Inventors: Susanne Holzer, Ottweiler (DE); René Gross, Neunkirchen (DE)

(73) Assignee: POLYCINE GMBH, Schiffweiler (DE)

( * ) Notice: Subject to any disclaimer, the term of this patent is extended or adjusted under 35 U.S.C. 154(b) by 292 days.

(21) Appl. No.: 18/344,551

(22) Filed: Jun. 29, 2023

(65) Prior Publication Data

US 2024/0002617 A1   Jan. 4, 2024

(30) Foreign Application Priority Data

Jun. 30, 2022   (EP) ..................... 22182141

(51) Int. Cl.
*C08J 7/04*       (2020.01)
*A61J 1/10*       (2006.01)

(52) U.S. Cl.
CPC ............... *C08J 7/042* (2013.01); *A61J 1/10* (2013.01); *C08J 2323/12* (2013.01); *C08J 2423/16* (2013.01); *C08J 2453/02* (2013.01)

(58) Field of Classification Search
None
See application file for complete search history.

(56) References Cited

U.S. PATENT DOCUMENTS

| | | |
|---|---|---|
| 4,516,977 A | 5/1985 | Herbert |
| 5,026,347 A | 6/1991 | Patel |
| 5,783,269 A | 7/1998 | Heilmann et al. |

(Continued)

FOREIGN PATENT DOCUMENTS

| | | |
|---|---|---|
| DE | 20320212 U1 | 8/2004 |
| DE | 10361851 A1 | 7/2005 |

(Continued)

*Primary Examiner* — Ramsey Zacharia
(74) *Attorney, Agent, or Firm* — RAPHAEL BELLUM PLLC

(57) ABSTRACT

Heat-sterilizable multilayer film having high low-temperature impact strength, comprising
(a) a first polymer layer (A) containing polypropylene homopolymer modified with impact modifier;
(b) a second polymer layer (B) containing:
B1) 15% to 45% by weight of polypropylene terpolymer and/or polyethylene elastomer,
B2) 20% to 30% by weight of styrene block copolymer elastomer;
B3) 20% to 40% by weight of propylene-ethylene block copolymer;
B4) 15% to 30% by weight of polybutene-1 plastomer and/or polyethylene composite (Tm>125° C., density 945 to 960 kg/m$^3$); and
(c) a central polymer layer (C) containing:
C1) 20% to 30% by weight of styrene block copolymer elastomer;
C2) 15% to 30% by weight of polyethylene elastomer;
C3) 40% to 65% by weight of propylene-ethylene block copolymer;
C4) 0% to 20% by weight of polypropylene terpolymer, random propylene-ethylene copolymer and/or polybutene-1 plastomer,
and also method for producing said film, container produced therefrom, and use of said film for medical purposes.

20 Claims, 1 Drawing Sheet

(56) References Cited

U.S. PATENT DOCUMENTS

| | | | |
|---|---|---|---|
| 2014/0091047 A1 | 4/2014 | Radwanski et al. | |
| 2015/0190309 A1 | 7/2015 | Zia | |
| 2020/0353723 A1* | 11/2020 | Lu | C08L 23/142 |
| 2022/0032592 A1 | 2/2022 | Holzer et al. | |

FOREIGN PATENT DOCUMENTS

| | | |
|---|---|---|
| DE | 202013103803 U1 | 11/2014 |
| EP | 0119469 A2 | 9/1984 |
| EP | 0199871 A2 | 11/1986 |
| EP | 0229475 A1 | 7/1987 |
| JP | 2019111805 A | 7/2019 |
| JP | 2019167430 A | 10/2019 |
| KR | 100812353 B1 | 3/2008 |
| KR | 101260463 B1 | 5/2013 |
| WO | 2012010415 A1 | 1/2012 |
| WO | 2020/127227 A1 | 6/2020 |
| WO | 2022189345 A1 | 9/2022 |

* cited by examiner

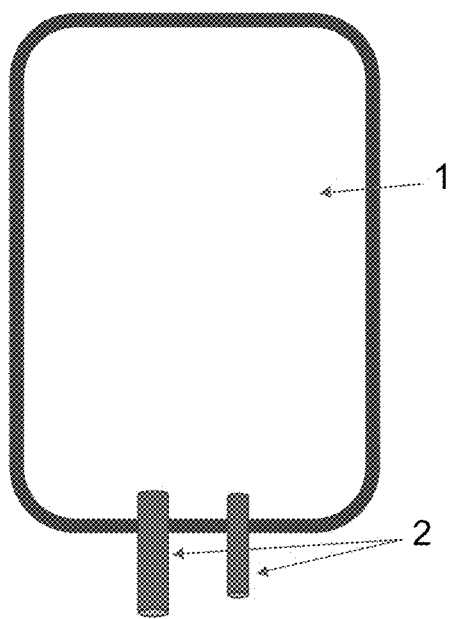

FLEXIBLE MULTILAYER FILM HAVING HIGH LOW-TEMPERATURE IMPACT STRENGTH FOR MEDICAL PACKAGES

CROSS-REFERENCE TO RELATED APPLICATIONS

This application claims priority to European Patent Application No. EP 22182141.6, filed Jun. 30, 2022, which is incorporated herein by reference.

BACKGROUND OF THE INVENTION

Multilayer films have had a broad range of applications for many years, for example in the food industry, but also in the medical/pharmaceutical sector, for example as secondary packaging material (overpackaging) or primary packaging material for solution bags, dry concentrates and medicaments in tablet form.

Some multilayer films are processable into flexible packages which are, for example, suitable as bags for packaging and administering medical solutions. Medical solutions, for example infusion solutions for parenteral administration, in flexible disposable bags made of polyvinyl chloride (PVC) or non-PVC materials are currently found on the market as standard practice.

Not only must said bags have the ability to collapse, which ensures complete drainage of the bag, but they must also exhibit further performance criteria such as transparency, ability to undergo hot-steam sterilization at 121° C., sufficient mechanical strength especially under dynamic load in the region of weld seams, for example during low-temperature centrifugation of the bag or bag system filled with medical solution or with blood plasma in particular, and a minimal effect by the package on the bag contents from a pharmaceutical perspective. Multilayer films having a layer structure and based on polyolefins have been found to be advantageous in relation to the aforementioned properties.

U.S. Pat. No. 5,783,269 discloses heat-sterilizable multilayer films for producing medical bags, containing an outer layer (2), a supporting layer (4) and a flexible central layer (3) with or without a heat-sealing layer (5), wherein all the layers contain polyolefin homopolymers and/or polyolefin copolymers (softening temperature: (2) and (4) >121° C., (3) <70° C.). Example 4-ply films are made up of: (2) and (4) PP homopolymer, (3) PE or PP copolymer, (5) PP copolymer.

EP-A 0229475 describes a multilayer film, preferably a 3-ply multilayer film, for medical containers, containing (a) a first (=inner) heat-sealable layer composed of a mixture of a (i) polypropylene, (ii) an ethylene copolymer and (iii) a modifier such as a further ethylene copolymer or an elastomer (e.g. EPDM terpolymer, SBS, SEBS and SIS copolymer); (b) a second (central) layer composed of a mixture of (i) polyethylene (PE) (50% to 90% by weight) and (ii) a modifier; and (c) a third (outer) layer composed of a mixture of (i) polypropylene and (ii) a modifier. Preference is given to using modified PP copolymers for the outer layer.

EP-A 0199871 describes a flexible multilayer film, inter alia 3-ply multilayer film, for medical bags, comprising: (a) an (inner) sealant layer containing an (optionally modified) ethylene-propylene copolymer (ethylene content: 3.8% by weight); (b) a central layer composed of a flexible polymeric material (e.g. an elastomeric copolymer or terpolymer such as EPDM) and (c) an outer layer containing an ethylene-propylene copolymer.

DE-A 10361851 and WO 2020/127227 A1 describe a heat-sterilizable 3-ply multilayer film for producing medical bags, the outer layer of which consists of polypropylene homopolymer modified with impact modifiers (at least 70% by weight, 97% by weight in the example), the central layer of which consists of polypropylene terpolymer modified with impact modifiers, and the (sealable) inner layer of which consists of polypropylene terpolymer and/or polypropylene copolymer modified with impact modifiers. Suitable impact modifiers are styrene-ethylene/butylene (SEBS) block copolymers, styrene-ethylene/propylene (SEPS) block copolymers or ethylene/α-olefin copolymers. The central layer can contain 20% to 80% by weight of PP terpolymer, 0% to 40% by weight of polyethylene copolymer, 0% to 60% by weight of SEB block copolymer or SEP block copolymer. Example films have a central layer composed of 75% by weight of PP terpolymer, 20% by weight of SEBS block copolymer and 5% by weight of PE plastomer (ethylene/octene copolymer), and an inner layer composed of 85% or 75% by weight of PP terpolymer, 15% or 20% by weight of SEB block copolymer and 0% or 5% by weight of PE plastomer.

DE 203 20 212 A1 describes a heat-sterilizable 3-ply multilayer film produced by coextrusion for use for medical bags. Example films have an outer layer composed of 97% by weight of polypropylene homopolymer and 3% by weight of SEBS block copolymer, a central layer composed of 80% by weight of EXCELLEN, a heterophasic copolymer based on polypropylene and polyethylene, and 20% by weight of SEBS block copolymer, and an inner layer composed of 75% by weight of PP terpolymer, 20% by weight of SEBS block copolymer and 5% by weight of PE plastomer.

Although the known films already achieved good results in respect of flexibility, ability to undergo heat sterilization, and transparency, said films still have room for improvement, especially in respect of impact strength at relatively low temperatures, in many cases 4° C. to −70° C., in particular −18° C. to −70° C., and are of limited suitability for medical packages stored in a refrigerator or freezer.

Materials on the market for deep-freezing applications are, firstly, packages (e.g. bags) made of pure polyethylene (e.g. for food) or made of polyvinyl chloride (e.g. for blood plasma). PE bags, which have a very good low-temperature impact strength, have the disadvantage that they are unsuitable for heat-sterilization at 121° C., as required for medical films.

PVC-containing materials are regarded as harmful to health, since they usually contain plasticizers that often leak, and so attempts are being made to replace PVC with alternative materials.

DE 0119469 A2 describes bags for medical purposes, for example for storage of blood, that are provided with tube pieces, surrounded by a connecting layer composed of an ethylene-vinyl acetate copolymer (EVA). The bag material is, inter alia, selected from polyethylene (PE), polypropylene (PP), poly-n-butylene, polyisobutylene, preferably polyethylene. The tube piece can, inter alia, be composed of rigid PVC, PP, polyamide, polycarbonate, polyester, etc., and is preferably polycarbonate.

KR 10-1260463 B1 discloses PVC-free medical articles, in particular flexible tubes (e.g. for blood), composed of a polymeric material based on a cross-linked polypropylene-based elastomer, in particular a propylene-C4-C12-alpha-olefin copolymer, further containing a styrene-based elastomer (inter alia SEBS, SEPS). The flexible tubes can have a 3-ply structure.

KR 10-0812353 B1 describes non-PVC sealing elements or flexible-tube attachments composed of olefins for blood bags. The blood bag film has a thickness of 150 to 300 μm and has 3 layers of differing hardness, preferably composed of an ethylene-alpha-olefin copolymer, a propylene-ethylene copolymer and a polypropylene resin.

U.S. Pat. No. 5,026,347 discloses bags for blood plasma based on polyolefins, in particular a blend containing a Kraton G block copolymer (e.g. SEBS, 55% to 65% by weight), polypropylene (20% to 30% by weight) and a citrate ester.

US 2014/0091047 A1 and US 2015/0190309 A1 describe blood plasma bags which are produced from a PVC material or non-PVC material (such as PP, PE, ULDPE, VLDPE). Furthermore, blends with EVA and block copolymers such as Kraton® can also be used as bag material. The bags can be made up of multiple layers. Suitable for hot-steam sterilization is, in particular, a PP homopolymer or PP copolymer, preferably a random PP copolymer, which is to be contained in at least one layer at a proportion of at least 30% by weight, or alternatively a cross-linked EVA. Suitable for radiation sterilization are polymers based on 30% ethylene, or propylene homopolymers or copolymers modified with elastomers such as Kraton. To increase flexibility and toughness, at least one layer should preferably contain an elastomer (e.g. ULDPE, VLDPE, EVA or styrene-butadiene terpolymers (Kraton). In the examples (US 2014/0091047 A1), bags based on PP copolymers and a polyolefin-EVA blend are used for storing blood plasma.

The non-prior published patent application PCT/EP2022/055728 discloses a heat-sterilizable 3-ply multilayer film having high low-temperature impact strength for producing medical bags, the outer layer of which is composed of polypropylene homopolymer modified with impact modifiers, the central layer of which is composed of 40% to 65% by weight of a heterophasic propylene-ethylene copolymer (C2C3-HeCo), 20% to 30% by weight of a styrene block copolymer elastomer (SBC-E) and 15% to 30% by weight of an ethylene-C4-C8-alpha-olefin copolymer elastomer, and the inner layer of which is composed of 51% to 68% by weight of a polypropylene terpolymer, 12% to 22% by weight of SBC-E, and 15% to 35% by weight of C2C3-HeCo.

Example 3-ply films have a central layer composed of 55% by weight of C2C3-HeCo, 25% by weight of SEBS block copolymer and 20% by weight of ethylene/octene copolymer, and an inner layer composed of 65% by weight of PP terpolymer, 15% by weight of SEBS and 20% by weight of C2C3-HeCo.

The aforementioned plastics films and bags produced therefrom still have room for improvement as packaging material for deep-freezing applications (e.g. storage of medical solutions and blood plasma, and of cells and organic tissues). The preservation of cells and organic tissues is often achieved by cryopreservation at a temperature of up to −196° C. The preservation of blood plasma also places very special demands on the plastics packaging material used, since harmful substances (such as plasticizers) must not be released, it must not have an adverse effect on the plasmatic and cellular substances in the blood such as erythrocytes, thrombocytes and leukocytes, and furthermore it must not eliminate/adsorb substances from the blood and it must be impervious to the entry of microorganisms. Furthermore, it should be possible to store blood plasma ideally over a number of years, which requires temperatures of ≤−65° C.

Another disadvantage of the aforementioned prior art is that the ability of the bag to collapse in order to ensure complete emptying is also often inadequate.

It is therefore an object of the invention to provide a multilayer film for medical packages requiring a particularly good low-temperature impact strength, which multilayer film, or packages produced therefrom, does not have the above-mentioned disadvantages and is suitable for deep-freezing applications such as storage/cryopreservation of medical solutions, blood plasma, cells or organic tissue, in particular storage/cryopreservation of blood plasma. Furthermore, the multilayer film, or packages produced therefrom, shall maintain properties such as high transparency, ability to undergo hot-steam sterilization at 121° C., and sufficient mechanical strength especially under dynamic load in the region of weld seams, for example when the package filled with medical material is centrifuged at relatively low temperatures (e.g. in the cooled state). Bags produced from the multilayer film should be capable of collapsing, i.e. bags filled with medical solutions or blood plasma, for example, should be completely emptiable.

It is a further object of the invention to provide a method for producing the heat-sterilizable multilayer film, and a container, in particular a bag, for medical solutions, blood plasma, cells or organic tissue, in particular blood plasma, produced from the multilayer film, and a bag with welded-on port elements and/or flexible tubes for medical solutions or blood plasma that satisfies the aforementioned criteria, and a method for producing said container or bag.

SUMMARY OF THE INVENTION

The invention relates to a flexible, heat-sterilizable multilayer film based on aliphatic polyolefins that has a particularly good impact strength at relatively low temperatures, to a method for producing said film, and to the use of said film for medical packages (e.g. for medical solutions, for plant, animal or human cells, and organic tissue), preferably a bag for medical solutions and blood plasma. The invention further relates to a container or bag—with or without port elements and/or flexible tubes—for medical solutions or blood plasma, produced from the multilayer film.

BRIEF DESCRIPTION OF THE FIGURES

FIG. 1 shows a medical bag (1) comprising pieces of flexible tube (2) according to the invention.

DETAILED DESCRIPTION OF THE INVENTION

The invention provides a heat-sterilizable multilayer film comprising (consisting of)
a) a first polymer layer (A) containing (consisting of) at least one, preferably one, polypropylene homopolymer modified with at least one, preferably one, impact modifier;
b) a second polymer layer (B) containing (consisting of):
B1) 15% to 45% by weight, preferably 17% to 35% by weight, particularly preferably 19% to 30% by weight—based on (B)—of at least one, preferably one, component B1) selected from the group consisting of: polypropylene terpolymers and polyethylene elastomers which are copolymers of ethylene and an alpha-olefin containing 4 to 12 carbon atoms;
B2) 20% to 30% by weight, preferably 22% to 28% by weight, particularly preferably 23% to 27% by weight—based on (B)—of at least one styrene block copolymer (SBC) elastomer;

B3) 20% to 40% by weight, preferably 25% to 35% by weight, particularly preferably 27% to 33% by weight—based on (B)—of at least one propylene-ethylene (block) copolymer, in which—based on (B3)—the proportion of the structural units of ethylene is 9% by weight, in many cases 9% to 15% by weight, preferably 10% by weight;

B4) 15% to 30% by weight, preferably 18% to 28% by weight, particularly preferably 19% to 26% by weight—based on (B)—of at least one, preferably one, component B4) selected from the group consisting of: polybutene-1 plastomers and polyethylene composites having a melting temperature of >125° C. and a density of 945 to 960 kg/m$^3$; and c) a central polymer layer (C) situated between the first polymer layer (A) and the second polymer layer (B), containing (consisting of):

C1) 20% to 40% by weight, preferably 25% to 40% by weight, particularly preferably 30% to 38% by weight—based on (C)—of at least one styrene block copolymer (SBC) elastomer;

C2) 15% to 30% by weight, preferably 18% to 30% by weight, particularly preferably 20% to 28% by weight—based on (C)—of at least one polyethylene elastomer which is a copolymer of ethylene with an alpha-olefin containing 4 to 12 carbon atoms;

C3) 25% to 50% by weight, preferably 25% to 45% by weight, particularly preferably 25% to 39% by weight—based on (C)—of at least one propylene-ethylene (block) copolymer, in which—based on (C3)—the proportion of the structural units of ethylene is 9% by weight, in many cases 9% to 15% by weight, preferably 10% by weight; and C4) 0% to 20% by weight, preferably 1% to 15% by weight, particularly preferably 3% to 12% by weight—based on (C)—of at least one, preferably one, component C4) selected from the group consisting of: polypropylene terpolymers, random propylene-ethylene copolymers and polybutene-1 plastomers.

The proportions indicated in percent by weight add up to 100% by weight in each case.

If component C4) is present, the proportion thereof is at least 1% by weight, preferably at least 3% by weight, based in each case on the central polymer layer (C).

In the context of the present invention, the structural units of a monomer in a (co)polymer are to be understood to mean the structural units derived from the monomer incorporated by polymerization.

The term "heat-sterilizable" means that corresponding materials can be subjected to sterilization at elevated temperatures, preferably steam sterilization. Sterilization refers to methods by means of which materials and articles are cleared of living microorganisms. The state of the materials and articles that is thereby achieved is referred to as "sterile". In the case of the steam sterilization of the filled or unfilled medical packages, hot steam is used for the sterilization, which is typically carried out in an autoclave. This involves heating the medical packages for preferably 20 minutes to 121° C. at 2 bar pressure in steam. The air inside the autoclave is completely replaced by steam. In the case of use of the medical package for blood plasma, cells or organic tissue, only the unfilled package is subjected to hot-steam sterilization as described above.

The term "multilayer film" refers to thermoplastic materials in multiple coextruded polymer layers which are joined together to form a film in the form of a running web or sleeve.

The term "impact modifier" refers to polymeric materials, such as styrene block copolymer elastomers, polyethylene elastomers and polypropylene elastomers, which as a result of blending in the melt state improve the impact strength of the polymer surrounding the impact modifier.

The term "impact strength" refers to the property of a material to withstand a dynamic load. The Izod impact strength of plastics can be measured under defined conditions in accordance with the standard DIN EN ISO 180: 2013-08.

The cold-crack temperature of films can be determined in accordance with the standard DIN EN ISO 8570:1991-08 ("Plastics; film and sheeting; determination of cold-crack temperature").

The term "composite" means a homogeneous composition or a composite material.

First Polymer Layer (A)

The first polymer layer (A) of the multilayer film according to the invention is, by definition, the polymer layer which, when processing the film into a package that is preferably a bag, is situated on the outside of the package. Therefore, it is in direct contact with the surface of the welding tool when further processing the film into packages and therefore preferably requires a high melting/softening temperature which is preferably above 125° C., particularly preferably between 127° C. and 150° C. and very particularly preferably between 130° C. and 145° C.

The first polymer layer (A) contains at least one, preferably one, polypropylene homopolymer which is modified with at least one, preferably one, impact modifier. Preferably, the first polymer layer (A) consists of at least one, preferably one, polypropylene homopolymer which is modified with at least one, preferably one, impact modifier.

More preferably, the first polymer layer (A) contains a polypropylene homopolymer which is modified with one impact modifier.

The first polymer layer (A) contains (or consists of) at least one, preferably one, polypropylene homopolymer which is generally modified with 5% to 20% by weight, particularly preferably 5% to 15% by weight, in particular 7% to 12% by weight, of at least one impact modifier to improve (low-temperature) impact strength.

The preparation of polypropylene homopolymers is known. Furthermore, polypropylene homopolymers are commercially available, for example from Lyondell Basell Corporation, USA.

Preferably, the first polymer layer (A) contains (or consists of) a polypropylene homopolymer which is modified with at least one impact modifier selected from the group consisting of: styrene block copolymers, such as styrene-ethylene-butylene-styrene block copolymers (SEBS), styrene-ethylene-propylene-styrene-block copolymer (SEPS), styrene-isoprene-styrene block copolymer (SIS), and styrene-butadiene-styrene block copolymer (SBS), preferably SEBS and SEPS, in particular SEBS, and/or polyethylene elastomers, such as copolymers of ethylene with at least one alpha-olefin containing 4 to 16, preferably 4 to 12, particularly preferably 4 to 8, carbon atoms, very particularly preferably ethylene-butylene copolymers and/or ethylene-octene copolymers.

Particularly preferably, the first polymer layer (A) contains (or consists of) 80% to 95% by weight, in particular 85% to 95% by weight, of a polypropylene homopolymer and 5% to 20% by weight, in particular 5% to 15% by weight, of a styrene block copolymer and/or a copolymer of ethylene with at least one alpha-olefin containing 4 to 12, preferably 4 to 8, carbon atoms.

In a preferred embodiment, the first polymer layer (A) contains (or consists of) 85% to 95% by weight, preferably 88% to 93% by weight, of a polypropylene homopolymer and 5% to 15% by weight, preferably 7% to 12% by weight, of a styrene-ethylene/butylene block copolymer.

The specified weights for the components of the first polymer layer (A) are based on the total weight of the first polymer layer (A).

Second Polymer Layer (B)

The second polymer layer (B) is, by definition, the polymer layer which, when processing the multilayer film according to the invention into a package that is preferably a bag, is situated on the inside of the package. Said polymer layer is responsible for the ability to tightly seal the package by heat sealing. The second polymer layer (B) of the film must be heat-sealable with itself and with appropriately inserted port elements in a secure manner and at a lowest possible temperature and with a shortest possible welding time and nevertheless be heat-sterilizable at temperatures of greater than 121° C. A low welding temperature is particularly important for minimizing structural stresses on the film structure. Therefore, the melting/softening temperature of the second polymer layer (B) is generally above 121° C., preferably between 122° C. and 135° C., particularly preferably between 124° C. and 130° C., but in any case below the melting/softening temperature of the first polymer layer (A).

The second polymer layer (B) of the multilayer film according to the invention contains (or consists of) components B1), B2), B3) and B4) in the following proportions (based in each case on (B)):

B1) 15% to 45% by weight, preferably 17% to 35% by weight, particularly preferably 19% to 30% by weight;
B2) 20% to 30% by weight, preferably 22% to 28% by weight, particularly preferably 23% to 27% by weight;
B3) 20% to 40% by weight, preferably 25% to 35% by weight, particularly preferably 27% to 33% by weight;
B4) 15% to 30% by weight, preferably 18% to 28% by weight, particularly preferably 19% to 26% by weight.

Components (B2) and (B3) acts as impact modifier and ensure an improvement in the impact strength of the second polymer layer (B), particularly at low temperatures. The second polymer layer (B) of the multilayer film according to the invention has a rough surface, especially due to component (B4), and so, when using the multilayer film according to the invention as a bag, the (inner) layer (B) being in contact with medical solutions or blood plasma for example, complete emptying of the bag is ensured.

Component B1)

The at least one, preferably one, component B1) is selected from the group consisting of: polypropylene terpolymers and polyethylene elastomers which are copolymers of ethylene and an alpha-olefin containing 4 to 12 carbon atoms.

The term "terpolymer" denotes a copolymer which has been prepared from three different monomers.

The term "polypropylene terpolymer" refers to a polypropylene molecular chain modified with two additional comonomers in the polymerization process. Preferred additional comonomers are ethylene and/or at least one $C_4$-$C_{12}$ α-olefin, preferably ethylene and a $C_4$-$C_{12}$ α-olefin, particularly preferably ethylene and a $C_4$-$C_8$ α-olefin, very particularly preferably ethylene and 1-butene.

Particularly preferably, the polypropylene terpolymer used as component B1) is at least one, preferably one, terpolymer of propylene, ethylene and a $C_4$-$C_{12}$ α-olefin, in which the proportion of ethylene is preferably 1% to 4% by weight and the proportion of the $C_4$-$C_{12}$α-olefin, preferably $C_4$-$C_8$ α-olefin, in particular 1-butene, is preferably 9% to 12% by weight, based in each case on the terpolymer.

The proportions by weight are based in each case on the structural units of the monomers incorporated into the terpolymer by polymerization.

Very particularly preferably, the polypropylene terpolymer is made up of structural units of propylene, ethylene and butylene.

The monomers are generally randomly incorporated in the polypropylene terpolymer, i.e. the polypropylene terpolymer used as component B1) is usually a random polypropylene terpolymer.

Preferably, the polyethylene elastomer used as component B1) is at least one, preferably one, polyethylene elastomer which is a copolymer of ethylene with an alpha-olefin containing 4 to 8 carbon atoms.

The proportion of the structural units of the alpha-olefin—based on the elastomer—is preferably 20% to 30% by weight.

Particularly preferably, the polyethylene elastomer used as component B1) is an ethylene-butylene copolymer and/or an ethylene-1-octene copolymer, in particular an ethylene-1-octene copolymer.

Component B2)

Component B2) is at least one, preferably one, styrene block copolymer (SBC) elastomer.

The term "styrene block copolymer elastomer" refers to synthetic thermoplastic elastomers based on styrene block copolymers for impact modification of polypropylene.

The at least one styrene block copolymer (SBC) elastomer B2) is preferably selected from the group consisting of: styrene-ethylene-butylene-styrene block copolymer (SEBS), styrene-ethylene-propylene-styrene block copolymer (SEPS), styrene-ethylene-ethylene-propylene-styrene block copolymer (SEEPS), styrene-isoprene-styrene block copolymer (SIS) and styrene-butadiene-styrene block copolymer (SBS), and particularly preferably SEBS and SEPS, in particular SEBS.

It is also possible to partially replace the styrene block copolymer (SBC) elastomer with one or more thermoplastic olefin-based elastomers (TPE-O) (proportion of TPE-O: not more than 45% by weight, preferably 20% to 30% by weight).

Preferably, component B2) is a styrene block copolymer (SBC) elastomer which does not contain any proportions of a thermoplastic olefin-based elastomer.

Component B3)

Component B3) is at least one, preferably one, propylene-ethylene (block) copolymer, in which—based on (B3)—the proportion of the structural units of ethylene is 9% by weight, in many cases 9% to 15% by weight, preferably 10% by weight, more preferably 10% to 12% by weight.

Propylene-ethylene copolymers B3) are often also referred to as "heterophasic" copolymers. Generally, the propylene-ethylene copolymer B3) is a propylene-ethylene block copolymer which has ethylene and propylene polymer blocks and thereby forms a heterogeneous phase (morphology).

Heterophasic propylene-ethylene (block) copolymers B3) differ both in their composition (proportion of the ethylene structural units 9% by weight) and in their properties from propylene-ethylene copolymers with a random distribution of the two monomers, in which the proportion of the structural units of ethylene is generally not more than 8% by weight, in many cases not more than 5% by weight. Such random propylene-ethylene copolymers usually form a homogeneous phase (morphology).

Component B4)

The at least one, preferably one, component B4) is selected from the group consisting of: polybutene-1 plastomers and polyethylene composites having a melting temperature of >125° C. and a density of 945 to 960 kg/m$^3$.

The polybutene-1 plastomer used as component B4) is based on a polybutene-1 homopolymer and/or a polybutene-1 copolymer.

Suitable polybutene-1 plastomers are commercially available, for example as Koattro KT MR05, Toppyl PB 8640M or Purell® KT MR07 from LyondellBasell or as Tafmer BL 2481M from Mitsui.

The polyethylene composite used as component B4) is at least one, preferably one, polyethylene composite having a melting temperature of >125° C. and a density of 945 to 960 kg/m$^3$.

The polyethylene composite used as component B4) generally consists of: 65% to 85% by weight—based on composite—of ethylene homopolymer, and 15% to 35% by weight, preferably 20% to 30% by weight—based on composite—of at least one, preferably one, ethylene copolymer which contains as comonomer at least one, preferably one, alpha-olefin having 4 to 12, preferably 4 to 8, particularly preferably 4 to 6 carbon atoms, very particularly preferably selected from 1-butene, 1-pentene, 1-hexene and 4-methyl-1-pentene, preferably 1-butene.

The polyethylene composite used as component B4) has a melting temperature of >125° C., preferably of 130° C. to 135° C., and a density of 945 to 960 kg/m$^3$.

The at least one, preferably one, ethylene copolymer contained in the polyethylene composite contains, besides the alpha-olefin having 4 to 12 carbon atoms, no further comonomers.

The proportion of the alpha-olefin comonomer—based on ethylene copolymer—is generally 25% to 40% by weight, preferably 30% to 37% by weight; the ethylene proportion—based on ethylene copolymer—is accordingly 60% to 75% by weight, preferably 63% to 70% by weight. The proportions by weight are based in each case on the structural units of the monomers incorporated into the ethylene copolymer by polymerization.

Preferably, the polyethylene composite used as component B4) consists of: 70% to 80% by weight—based on composite—of ethylene homopolymer, and 20% to 30% by weight—based on composite—of least one, preferably one, ethylene copolymer which contains as comonomer at least one, preferably one, alpha-olefin selected from 1-butene, 1-pentene, 1-hexene and 4-methyl-1-pentene, preferably 1-butene.

Particularly preferably, the polyethylene composite used as component B4) consists of: 70% to 80% by weight—based on composite—of ethylene homopolymer, and 20% to 30% by weight—based on composite—of ethylene-1-butene copolymer, in which the proportion of 1-butene—based on ethylene-1-butene copolymer—is 25% to 40% by weight, preferably 30% to 37% by weight.

The polyethylene composite used as component B4) generally contains a high-density polyethylene (HDPE), preferably an HDPE having a density of 950 to 970 kg/m$^3$, as ethylene homopolymer.

The preparation of HDPE is known to a person skilled in the art.

Furthermore, HDPE is commercially available; HDPE having a density of 950 to 970 kg/m$^3$ is, for example, available as Nipolon® P FY13 from Tosoh Co., Ltd. or as Bormed® HE2581-PH and Bormed HE7541-PH from *Borealis*.

The at least one ethylene copolymer contained in the polyethylene composite is usually prepared by copolymerization of ethylene and the alpha-olefin comonomer by means of a metallocene catalyst.

Suitable metallocene catalysts are organic compounds of a transition metal having multiple (number in line with the valency of the transition metal) ligands coordinated with the transition metal, of which at least one ligand is a cyclopentadienyl radical. The transition metal is preferably selected from the group consisting of Zr, Ti, Hf, V, Nb, Tn and Cr, and is particularly preferably Zr or Hf, very particularly preferably Zr. Preference is given to a Zr or Hf metallocene catalyst having two cyclopentadienyl radicals.

Particular preference is given to the metallocene catalyst bis(n-butylcylopentadienyl)zirconium dichloride.

The at least one ethylene copolymer is prepared by using the aforementioned metallocene catalysts as ionic complexes, which can be obtained by reaction of the metallocene catalyst with organically modified alumina. The alumina used can be all customary clay materials; preference is given to hectorite, smectite, and montmorillonite.

The organically modified alumina is obtained by reaction of alumina with an aliphatic salt. Examples of such an aliphatic salt are N,N-dimethyldecylamine hydrochloride, N, N-dimethyldodecylamine hydrochloride, N, N-dimethyltetradecylamine hydrochloride, N, N-dimethylhexadecylamine hydrochloride, N, N-dimethyloctadodecylamine hydrochloride, N, N-dimethylbehenylamine hydrochloride, N, N-dimethylbehenylamine hydrofluoride, N, N-dimethylbehenylamine hydrobromide and N, N-dimethylbehenylamine hydroiodide; preference is given to N,N-dimethylbehenylamine hydrochloride.

Preferably, the ethylene copolymer is prepared by additionally using an organoaluminium compound, preferably triisobutylaluminium, as co-catalyst.

The ethylene copolymer can be prepared in the presence of the metallocene catalyst, for example by a slurry process, a solution process or in the gas phase.

The preparation of ethylene-alpha-olefin copolymers by means of such a metallocene catalyst is, for example, described in JP-A 2019/111805 and JP-A 2019/167430.

The polyethylene composite used as component B4) contains a high-density ethylene copolymer; preferably, the ethylene copolymer has a density of 945 to 960 kg/m$^3$.

Component B4) is used to produce a rough surface of the (inner) layer or the second polymer layer (B) of the multilayer film according to the invention, thereby ensuring complete emptying of a bag which is produced therefrom and which is, for example, filled with medical solutions or blood plasma.

According to a preferred embodiment, the second polymer layer (B) of the multilayer film according to the invention contains (or consists of): a polypropylene terpolymer (as component B1) made up of structural units of propylene, ethylene and butylene, a styrene-ethylene-butylene-styrene block copolymer (SEBS) (as component B2), a propylene-ethylene (block) copolymer in which the proportion of the structural units of ethylene is 10% by weight (as component B3), and a polybutene-1 plastomer (as component B4).

Particularly preferably, the second polymer layer (B) according to the aforementioned embodiment contains (or consists of):

B1) 17% to 35% by weight, preferably 19% to 30% by weight, of a polypropylene terpolymer made up of structural units of propylene, ethylene and butylene;

B2) 22% to 28% by weight, preferably 23% to 27% by weight, of a styrene-ethylene-butylene-styrene block copolymer (SEBS);

B3) 25% to 35% by weight, preferably 27% to 33% by weight, of a propylene-ethylene (block) copolymer; and B4) 18% to 28% by weight, preferably 19% to 26% by weight, of a polybutene-1 plastomer.

According to a further preferred embodiment, the second polymer layer (B) of the multilayer film according to the invention contains (or consists of): an ethylene-1-octene copolymer (as component B1), a styrene-ethylene-butylene-styrene block copolymer (SEBS) (as component B2), a propylene-ethylene (block) copolymer in which the proportion of the structural units of ethylene is 10% by weight (as component B3), and a polyethylene composite (as component B4) consisting of: 70% to 80% by weight of ethylene homopolymer and 20% to 30% by weight of an ethylene-1-butene copolymer.

Particularly preferably, the second polymer layer (B) according to the aforementioned embodiment contains (or consists of):

B1) 17% to 35% by weight, preferably 19% to 30% by weight, of an ethylene-1-octene copolymer;

B2) 22% to 28% by weight, preferably 23% to 27% by weight, of a styrene-ethylene-butylene-styrene block copolymer (SEBS);

B3) 25% to 35% by weight, preferably 27% to 33% by weight, of a propylene-ethylene (block) copolymer; and B4) 18% to 28% by weight, preferably 19% to 26% by weight, of a polyethylene composite consisting of: 70% to 80% by weight of ethylene homopolymer and 20% to 30% by weight of an ethylene-1-butene copolymer.

The specified weights above for components B1), B2), B3) and B4) of the second polymer layer (B) are based on the total weight of the second polymer layer (B).

Central Polymer Layer (C)

The central polymer layer (C) has the largest proportion by mass (at least 50% by weight) of the multilayer film, preferably 60% to 95% by weight, particularly preferably 70% to 90% by weight, very particularly preferably 75% to 85% by weight of the entire multilayer film, and is used to improve the impact strength of the overall structure.

The central polymer layer (C) of the multilayer film according to the invention contains (or consists of) components C1), C2), C3) and optionally C4) in the following proportions (based in each case on (C)):

C1) 20% to 40% by weight, preferably 25% to 40% by weight, particularly preferably 30% to 38% by weight;

C2) 15% to 30% by weight, preferably 18% to 30% by weight, particularly preferably 20% to 28% by weight;

C3) 25% to 50% by weight, preferably 25% to 45% by weight, particularly preferably 25% to 39% by weight, very particularly preferably 25% to 35% by weight; and C4) 0% to 20% by weight, preferably 1% to 15% by weight, particularly preferably 3% to 12% by weight.

Component C1)

Component C1) is at least one, preferably one, styrene block copolymer (SBC) elastomer.

Styrene block copolymer (SBC) elastomer C1) has been defined as component B2), and so reference is made to the relevant discussions in relation to component B2).

Component C2)

Component C2) is at least one, preferably one, polyethylene elastomer which is a copolymer of ethylene with an alpha-olefin containing 4 to 12, preferably 4 to 8 carbon atoms.

The polyethylene elastomer used as component C2) has been defined as the polyethylene elastomer used as component B1), and so reference is made to the relevant discussions in relation to component B1).

Component C3)

Component C3) is at least one, preferably one, propylene-ethylene (block) copolymer, in which—based on (C3)—the proportion of the structural units of ethylene is ≥9% by weight, in many cases 9% to 15% by weight, preferably 10% by weight, more preferably 10% to 12% by weight.

The propylene-ethylene (block) copolymer used as component C3) has been defined as the propylene-ethylene (block) copolymer used as component B3), and so reference is made to the relevant discussions in relation to component B3).

Component C4)

The optional at least one, preferably one, component C4) is selected from the group consisting of: polypropylene terpolymers, random propylene-ethylene copolymers and polybutene-1 plastomers.

Preferably, component C4) is present.

The polypropylene terpolymer used as component C4) has been defined as the polypropylene terpolymer used as component B1), and so reference is made to the relevant discussions in relation to component B1).

The random propylene-ethylene copolymer used as component C4) is at least one, preferably one, random propylene-ethylene copolymer.

Random propylene-ethylene copolymers are to be understood to mean polypropylene copolymers (random copolymer) in which the propylene and ethylene monomers are randomly distributed. The proportion of the structural units of ethylene therein is generally not more than 8% by weight, in many cases not more than 5% by weight. Such random propylene-ethylene copolymers usually form a homogeneous phase (morphology).

Suitable random propylene-ethylene copolymers are, for example, commercially available as Purell® RP270G from LyondellBasell.

The polybutene-1 plastomer used as component C4) has been defined as the polybutene-1 plastomer used as component B4), and so reference is made to the relevant discussions in relation to component B4).

Component C4) improves the compatibility of the central layer C) with the second (inner) layer B), thereby making it possible to prevent possible delamination of the layer B).

Component C4) is preferably present and is preferably used in an amount of 1% to 15% by weight, particularly preferably 3% to 12% by weight, in many cases 5% to 15% by weight, based on C).

According to a preferred embodiment, the central polymer layer (C) of the multilayer film according to the invention contains (or consists of): a styrene-ethylene-butylene-styrene block copolymer (SEBS) (as component C1), an ethylene-1-octene copolymer (as component C2), a propylene-ethylene (block) copolymer in which the proportion of the structural units of ethylene is ≥10% by weight (as component C3), and a polybutene-1 plastomer (as component C4).

Particularly preferably, the central polymer layer (C) according to the aforementioned embodiment contains (or consists of):

C1) 25% to 40% by weight, preferably 30% to 38% by weight, of a styrene-ethylene-butylene-styrene block copolymer (SEBS);

C2) 18% to 30% by weight, preferably 20% to 28% by weight, of an ethylene-octene copolymer;

C3) 25% to 45% by weight, preferably 25% to 39% by weight, particularly preferably 25% to 35% by weight, of a propylene-ethylene (block) copolymer; and C4) 1% to 15% by weight, preferably 3% to 12% by weight, of a polybutene-1 plastomer.

The specified weights for components C1), C2), C3) and C4) of the central polymer layer (C) are based on the total weight of the central polymer layer (C).

According to a further preferred embodiment, the central polymer layer (C) of the multilayer film according to the invention contains (or consists of): a styrene-ethylene-butylene-styrene block copolymer (SEBS) (as component C1), an ethylene-1-octene copolymer (as component C2), a propylene-ethylene (block) copolymer in which the proportion of the structural units of ethylene is 10% by weight (as component C3), and a polypropylene terpolymer (as component C4) made up of structural units of propylene, ethylene and butylene.

Particularly preferably, the central polymer layer (C) according to the aforementioned embodiment contains (or consists of):

C1) 25% to 40% by weight, preferably 30% to 38% by weight, of a styrene-ethylene-butylene-styrene block copolymer (SEBS);

C2) 18% to 30% by weight, preferably 20% to 28% by weight, of an ethylene-octene copolymer;

C3) 25% to 45% by weight, preferably 25% to 39% by weight, of a propylene-ethylene (block) copolymer; and C4) 1% to 15% by weight, preferably 3% to 12% by weight, of a polybutene-1 plastomer.

Multilayer Film

Preferably, the heat-sterilizable multilayer film according to the invention consists of the polymer layers (A), (B) and (C).

In each of the polymer layers (A), (B) and (C), the multilayer film can contain customary amounts of customary additives and/or processing aids that are suitable for the intended use of the multilayer film.

Preferred additives are antioxidants and thermal stabilizers (phosphitic and phenolic stabilizers such as Irgafos® 168, Irgafos P-EPQ, Irganox® 1076 or Irganox 1010), and also acid scavengers such as DHT-4A®, synthetic hydrotalcite (SHT) and magnesium oxide (MgO).

Preferably, the heat-sterilizable multilayer film composed of the polymer layers (A), (B) and (C) according to the invention contains at least one antioxidant, one thermal stabilizer and/or one acid scavenger, preferably in a total amount of <3000 ppm, based on the entire multilayer film.

Preferably, the polymer layers (A), (B) and (C) adhere to one another without use of an adhesion promoter, i.e. the multilayer film according to the invention composed of the polymer layers (A), (B) and (C) preferably does not contain an adhesion promoter. Furthermore, preferably at least the second polymer layer (B) does not contain further additives and/or processing aids (e.g. modifiers, in particular plasticizers), very particular preference being give to none of the polymer layers (A), (B) and (C) containing further additives and/or processing aids in addition to the additives mentioned above as preferred. Consequently, a bag produced from the multilayer film according to the invention has no effect or hardly any effect on, for example, a medical solution or blood plasma during storage.

The layer thickness of the first polymer layer (A) is generally 5% to 15% by weight, preferably 7% to 13% by weight, particularly preferably 7.5% to 12.5% by weight, of the total film thickness of the multilayer film according to the invention.

The layer thickness of the second polymer layer (B) is generally 5% to 15% by weight, preferably 7% to 13% by weight, particularly preferably 7.5% to 12.5% by weight, of the total film thickness of the multilayer film according to the invention.

The central polymer layer (C) has the largest proportion (preferably at least 70% by weight of the total film thickness) of the multilayer film according to the invention and is used to improve the impact strength of the overall structure.

In a multilayer film consisting of (A), (B) and (C), the layer thickness of the central polymer layer (C) is generally 70% to 85% by weight, preferably 74% to 80% by weight.

The total film thickness of the multilayer film according to the invention is preferably 300 to 450 µm, particularly preferably 350 to 400 µm.

The total film thickness of a multilayer film according to the invention consisting of the polymer layers (A), (B) and (C) is preferably 300 to 450 µm, particularly preferably 350 to 400 µm.

Particular preference is given to a multilayer film according to the invention which consists of the polymer layers (A), (B) and (C) and is characterized in that the total film thickness of the multilayer film is 300 to 450 µm, particularly preferably 350 to 400 µm, and—based in each case on the total film thickness of the multilayer film—the layer thickness of the first polymer layer (A) is 5% to 15% by weight, preferably 7% to 13% by weight, the layer thickness of the second polymer layer (B) is 5% to 15% by weight, preferably 7% to 13% by weight; and the layer thickness of the central polymer layer (C) is 70% to 85% by weight, preferably 74% to 80% by weight; and the proportions of (A), (B) and (C) add up to 100% by weight in each case.

Method for Producing the Multilayer Film

The invention further provides a method for producing the multilayer film according to the invention, wherein the first polymer layer (A), the central polymer layer (C) and the second polymer layer (B) are coextruded.

Coextrusion comprises bringing together the plastics melts of the polymer layers (A), (B) and (C) before they leave the profile die of an extruder to form the multilayer film according to the invention.

In many cases, the extrusion process is a two-stage process. In a first step, the materials used for the individual polymer layers are mixed and compacted in extruders, preferably parallel twin-screw extruders (compounders), heating/cooling mixers or pellet presses. The plastics melts of the polymer layers (A), (B) and (C) are then brought together in another extruder, which is directly coupled or spatially and temporally separated, before they leave the profile die to form the multilayer film according to the invention.

Preferably, the multilayer film obtained by the method according to the invention is shock-cooled with water.

The coextrusion can yield the multilayer film according to the invention in the form of a flat film (flat film method, for example when using a slot die) or a film sleeve (blown film method, for example flooding the interior of the film sleeve with—preferably sterile-filtered—air), with, in the case of a film sleeve, the outside consisting of the first polymer layer (A) and the inside consisting of the second polymer layer (B).

The invention further provides a (medical) container with or without welded-on port elements and/or flexible tubes, in particular a (medical) bag with or without welded-on port elements and/or flexible tubes, for medical solutions, blood plasma, cells or organic tissue, produced from the multilayer film according to the invention, and a method for producing the (medical) container, preferably the (medical) bag.

The invention also provides for the use of the (medical) container according to the invention, in particular the (medical) bag according to the invention, for medical solutions, blood plasma, cells or organic tissue, preferably a bag for medical solutions or in particular blood plasma.

Owing to the specific polymer layers (C) and (B) of the multilayer film according to the invention, the (medical) container according to the invention, in particular the (medical) bag according to the invention, is especially also suitable for storing medical solutions or blood plasma at sub-zero temperatures to −70° C. or for cryopreservation of cells or organic tissue.

A method for producing a (medical) container according to the invention, preferably a bag, comprises the steps of:
a) providing at least one heat-sterilizable multilayer film according to the invention;
b) optionally providing one or more port elements and/or flexible tubes;
c) shaping a (medical) container, preferably a bag, from the at least one heat-sterilizable multilayer film, such that the second polymer layer (B) forms the inner face of the (medical) container, preferably the bag, and the first polymer layer (A) forms the outer face of the (medical) container, preferably the bag;
d) optionally positioning the port elements and/or flexible tubes between the inner faces at the contours of the (medical) container, preferably the bag;
e) contacting the inner faces with one another and with port elements and/or flexible tubes optionally positioned in between at the contours of the (medical) container, preferably the bag;
f) heat-sealing the inner faces with one another and with port elements and/or flexible tubes optionally positioned in between at the contours of the (medical) container, preferably the bag.

In step a), the multilayer film according to the invention is preferably provided in the form of a flat film or a tubular film. Depending on the form of the film that is provided, the remainder of the method can differ in specific details.

Depending on the application of the (medical) container according to the invention, preferably the bag, the method can comprise optionally providing additional elements, such as port elements and/or flexible tubes, in step b) following the provision of the multilayer film according to the invention. For example, providing these elements is appropriate if the (medical) container according to the invention, preferably the bag, is to be used as a fixed component of a medical device or is to be connected to a medical device. For example, omitting step b) may be appropriate if the (medical) container, preferably the bag, will be used merely for storing a medicament and will be damaged by, for example, tearing or piercing with a cannula for withdrawal of the medicament.

Preferably, step b) is present.

In step c), the provided multilayer film according to the invention is brought into the form of a (medical) container, in particular bag. If a tubular film was provided in step a), the shaping of the (medical) container, in particular the bag, can comprise, for example, just cutting the tubular film to the desired length, since the second polymer layer (B) already forms the inner face of the tubular film and the first polymer layer (A) already forms the outer face of the tubular film. If a flat film was provided in step a), the (medical) container, preferably the bag, can, for example, be shaped from one piece of multilayer film in step c) by cutting said piece into a mirror-symmetrical shape and folding it down along the mirror axis, such that the edges of the film lie on top of one another congruently, with the second polymer layer (B) on the inside. Alternatively, the (medical) container according to the invention, preferably the bag, can, for example, be shaped from two pieces of flat film by cutting the two pieces such that they are mirror-symmetrical in relation to one another and laying them on top of one another congruently, with the second polymer layer (B) on the inside. Cutting comprises matching the shape of the pieces of film to the intended use of the (medical) container. Rectangular shapes have the advantage of lowest material loss and simplest processability. Medical bags, in particular bags for blood plasma, have a specific shape with rounded corners.

Depending on whether additional elements such as port elements and/or flexible tubes were provided in step b), said elements can be positioned between the inner faces at the contours of the shaped (medical) container, preferably the bag, in step d). In the case of a tubular film, this means the insertion of the additional elements into the openings of the tubular film. Here, the elements can only be positioned on two mutually opposing sides of the (medical) container, preferably the bag. In the case of a flat film, the insertion of the additional elements between the edges of the one or more pieces of flat film that were laid on top of one another congruently in step c) is meant. Here, the elements can be positioned at any points along the edges, most preferably at two opposing edges.

Preferably, step d) is present.

In step e), the inner faces of the shaped (medical) container, preferably the bag, are contacted with one another and with the additional elements optionally present between the inner faces at the contours of said container or bag, so that they can be heat-sealed together by supply of heat and optionally mechanical pressure in step f). With the heat-sealing, the temperature is preferably chosen such that it lies above the melting/softening point of the second polymer layer (B), but below the melting/softening point of the first polymer layer (A). This can ensure that the second polymer layer (B) melts at the contours of the (medical) container, preferably the bag, and thereby permanently and fluid-tightly seals it, whereas the first polymer layer (A) retains its form and thereby maintains the stability of the medical package, preferably the bag.

An important criterion for the use of the multilayer film according to the invention as primary packaging material for medical solutions or blood plasma is the barrier effect against loss of liquid and the prevention of entry of microorganisms. Such loss of liquid results in concentration of the active ingredients in solution, which loss of liquid must not exceed specific values. Loss of liquid during storage determines, inter alia, the shelf life of the product. The formulation of the multilayer film according to the invention is chosen such that a water vapour barrier in accordance with DIN EN ISO 3826-1 is achieved together with good impact strength. In addition, the storage of specific blood constituents, such as thrombocyte concentrates, may require specific gas exchange rates for oxygen and carbon dioxide.

The heat-sterilizable multilayer film according to the invention is distinguished by the fact that it is securely heat-sealable even with port elements by means of a continuous-heat welding method, manages without plasticizers, has hardly any effect on medical solutions, blood plasma, cells or organic tissue, and exhibits a suitable water vapour barrier. At the same time, the multilayer film according to the invention exhibits a significantly improved low-temperature impact strength. Containers, in particular bags, according to the invention that are producible therefrom are suitable for storage of medical solutions or blood plasma at sub-zero temperatures to −70° C. or for cryopreservation of cells or organic tissue.

Preference according to the invention is given to a (medical) container with welded-on port elements and/or flexible tubes, in particular a (medical) bag with welded-on port elements and/or flexible tubes, for medical solutions, blood plasma, cells or organic tissue, in particular for blood plasma, produced from the multilayer film according to the invention, wherein the port elements and/or flexible tubes are composed of a multilayer flexible tube containing (consisting of):

- x) a first polymer layer (X) containing (consisting of) at least one, preferably one, random propylene-ethylene copolymer and/or polypropylene terpolymer modified with at least one impact modifier; preferably at least one, preferably one, random propylene-ethylene copolymer and/or polypropylene terpolymer modified with 15% to 40% by weight of at least one impact modifier selected from the group consisting of: styrene block copolymers, such as styrene-ethylene-butylene-styrene block copolymers (SEBS), styrene-ethylene-propylene-styrene block copolymer (SEPS), styrene-isoprene-styrene block copolymer (SIS), and styrene-butadiene-styrene block copolymer (SBS), preferably SEBS and SEPS, in particular SEBS, and/or polyethylene elastomers, such as copolymers of ethylene with at least one alpha-olefin containing 4 to 16, preferably 4 to 12, particularly preferably 4 to 8 carbon atoms, in particular ethylene-butylene copolymers and/or ethylene-octene copolymers;
- y) a second polymer layer (Y) containing (consisting of):
  - Y1) 20% to 50% by weight—based on (Y)—of at least one polypropylene terpolymer and/or random propylene-ethylene copolymer;
  - Y2) 20% to 50% by weight—based on (Y)—of at least one impact modifier selected from the group of styrene block copolymers, such as styrene-ethylene-butylene-styrene block copolymers (SEBS), styrene-ethylene-propylene-styrene block copolymer (SEPS), styrene-isoprene-styrene block copolymer (SIS), and styrene-butadiene-styrene block copolymer (SBS), preferably SEBS and SEPS, in particular SEBS;
  - Y3) 10% to 50% by weight—based on (Y)—of at least one polyethylene elastomer which is a copolymer of ethylene and an alpha-olefin containing 4 to 12 carbon atoms or is a copolymer of ethylene and a carbonyl compound;
- z) a central polymer layer (Z) situated between the first polymer layer (X) and the second polymer layer (Y) and containing (consisting of):
  - Z1) 30% to 70% by weight—based on (Z)—of at least one impact modifier selected from the group consisting of: styrene block copolymers, such as styrene-ethylene-butylene-styrene block copolymers (SEBS), styrene-ethylene-propylene-styrene block copolymer (SEPS), styrene-isoprene-styrene block copolymer (SIS), and styrene-butadiene-styrene block copolymer (SBS), preferably SEBS and SEPS, in particular SEBS, and/or polyethylene elastomers such as copolymers of ethylene with at least one alpha-olefin containing 4 to 16, preferably 4 to 12, particularly preferably 4 to 8 carbon atoms, in particular ethylene-butylene copolymers and/or ethylene-octene copolymers;
  - Z2) 30% to 70% by weight—based on (Z)— of at least one polypropylene terpolymer and/or random propylene-ethylene copolymer, preferably a random propylene-ethylene copolymer.

In the layers (X), (Y) and (Z), the aforementioned polymers have been defined as the corresponding polymers (of the layers (A), (B) and (C)) already mentioned above.

A copolymer of ethylene and a carbonyl compound designated as component Y3) is to be understood as meaning, for example, a copolymer of ethylene and a carboxylic acid, a carboxylic ester, an aldehyde or a ketone. Suitable carbonyl compounds are, for example, ethenyl acetates.

Preferably, a polyethylene elastomer which is a copolymer of ethylene and an alpha-olefin containing 4 to 12 carbon atoms is used as component Y3).

Particularly preferably, the port elements and/or flexible tubes of the above-described (medical) container, in particular (medical) bag, are composed of a multilayer flexible tube containing layers (X), (Y) and (Z) consisting of:

- (X): 60% to 85% by weight, preferably 65% to 85% by weight, of at least one polypropylene terpolymer made up of structural units of propylene, ethylene and butylene and/or random propylene-ethylene copolymer, and 15% to 40% by weight, preferably 15% to 35% by weight, of at least one impact modifier selected from the group consisting of: styrene block copolymers, in particular SEBS and/or SEPS, and/or copolymers of ethylene with at least one alpha-olefin containing 4 to 12 carbon atoms, in particular an ethylene-butylene copolymer and/or ethylene-octene copolymer;
- (Y): Y1) 20% to 35% by weight of at least one polypropylene terpolymer made up of structural units of propylene, ethylene and butylene and/or random propylene-ethylene copolymer;
  - Y2) 25% to 45% by weight of at least one impact modifier selected from the group of styrene block copolymers, in particular SEBS and/or SEPS;
  - Y3) 10% to 50% by weight of at least one polyethylene elastomer which is a copolymer of ethylene and an alpha-olefin containing 4 to 8 carbon atoms, in particular an ethylene-octene copolymer;
- (Z): Z1) 40% to 70% by weight of at least one impact modifier selected from the group consisting of: styrene block copolymers, in particular SEBS and/or SEPS, and/or copolymers of ethylene with at least one alpha-olefin containing 4 to 12 carbon atoms, in particular ethylene-butylene copolymers and/or ethylene-octene copolymers;
  - Z2) 30% to 60% by weight of at least one random propylene-ethylene copolymer.

FIG. 1 shows a medical bag (1) comprising pieces of flexible tube (2) according to the invention The flexible tube optionally used according to the invention generally has a length of at least ≥200 mm, an inner diameter of ≥2.7 mm, and a wall thickness of ≥0.5 mm, preferably ≥1 mm.

Generally, the (medical) containers, in particular bags, according to the invention have a volume of 150 to 600 ml.

The invention will be more particularly elucidated below on the basis of examples without being limited thereby.

Example 1

First Polymer Layer (A):
- 90% by weight of Moplen® HP525J from Lyondell Basell Corp., USA/polypropylene homopolymer
- 10% by weight of Tuftec® H1062 from Asahi Kasei, Japan/styrene-ethylene/butylene block copolymer The stated formulation was mixed in the melt state in a separate compounding step and granulated for further use.

Central Polymer Layer (C):
- 30% by weight of Adflex® C290F from LyondellBasell/ heterophasic propylene copolymer
- 35% by weight of Tuftec® H1062 from Asahi Kasei, Japan/styrene-ethylene/butylene block copolymer
- 25% by weight of Engage® 8003 from Dow Chemical Company, USA/ethylene-octene polyolefin elastomer
- 10% by weight of Koattro KT MR05 from LyondellBasell/polybutene-1

The stated formulation was mixed in the melt state in a separate compounding step and granulated for further use.

Second Polymer Layer (B):
- 25% by weight of Bormed® TD109CF from *Borealis*, Austria/polypropylene terpolymer
- 25% by weight of Tuftec® H1062 from Asahi Kasei, Japan/styrene-ethylene/butylene block copolymer
- 30% by weight of Adflex® C290F from LyondellBasell/ heterophasic propylene copolymer
- 20% by weight of Koattro KT MR05 from LyondellBasell/polybutene-1

The stated formulation was mixed in the melt state in a separate compounding step and granulated for further use.

The melts from the granulated compounds of the first polymer layer (A), the central polymer layer (C) and the second polymer layer (B) were coextruded using process parameters customary for polypropylene (temperature of 180° C. to 230° C.), and a multilayer film was obtained.

The film was made with a total thickness of 350 µm, with the first polymer layer (A) and second polymer layer (B) both having a thickness of 35 µm and the central polymer layer (C) having a thickness of 280 µm. The film produced was sterilized using hot steam.

A medical bag was shaped from two of the multilayer films produced, with the second polymer layer (B) forming the inner face of the bag and the first polymer layer (A) forming the outer face of the bag and two flexible tubes composed of a below-described material (outer diameter: 4.1 mm, inner diameter: 2.7 mm) being positioned between the inner faces at the contours of the bag. After that, the inner faces were contacted with one another and with the flexible tubes positioned in between at the contours of the bag and, thereafter, the inner faces were permanently heat-sealed with one another and with the flexible tubes positioned in between at the contours of the bag with the aid of welding tools temperature-adjusted to 134° C. to 142° C.

Material of Flexible Tube:

First Polymer Layer (X):
- 65% by weight of Purell® RP270G from LyondellBasell/ random propylene-ethylene copolymer
- 35% by weight of Tuftec® H1062 from Asahi Kasei, Japan/styrene-ethylene/butylene block copolymer The stated formulation was mixed in the melt state in a separate compounding step and granulated for further use.

Central Polymer Layer (Z):
- 30% by weight of Tuftec® H1521 from Asahi Kasei, Japan/styrene-ethylene/butylene block copolymer
- 40% by weight of Purell® RP270G from LyondellBasell/ random ethylene-propylene copolymer
- 30% by weight of Hybrar® 7311 from Kuraray/styrene-ethylene/propylene block copolymer The stated formulation was mixed in the melt state in a separate compounding step and granulated for further use.

Second Polymer Layer (Y):
- 35% by weight of Tuftec® H1521 from Asahi Kasei, Japan/styrene-ethylene/butylene block copolymer
- 30% by weight of Engage® 8003 from Dow Chemical Company, USA/ethylene-octene polyolefin elastomer
- 35% by weight of Bormed® TD109CF from *Borealis*, Austria/polypropylene terpolymer The stated formulation was homogeneously mixed in the melt state in a separate compounding step and granulated for further use.

The melts from the granulated compounds of the first polymer layer (X), the central polymer layer (Z) and the second polymer layer (Y) were produced using process parameters customary for polypropylene on a specific blown film system for the multilayer coextrusion of medical flexible tubes with water cooling. The interior of the flexible tube is flooded with sterile-filtered air.

The bag comprising the pieces of flexible tube that is obtained is very highly suitable for the storage of blood plasma at low temperatures of, for example, −65° C.

Example 2

First Polymer Layer (A): Composition and Preparation as in Example 1

Central Polymer Layer (C):
- 30% by weight of Adflex® C290F from LyondellBasell/ heterophasic propylene copolymer
- 35% by weight of Tuftec® H1062 from Asahi Kasei, Japan/styrene-ethylene/butylene block copolymer
- 25% by weight of Engage® 8003 from Dow Chemical Company, USA/ethylene-octene polyolefin elastomer
- 10% by weight of Bormed® TD109CF from *Borealis*, Austria/polypropylene terpolymer The stated formulation was mixed in the melt state in a separate compounding step and granulated for further use.

Second Polymer Layer (B):
- 25% by weight of Engage® 8003 from Dow Chemical Company, USA/ethylene-octene polyolefin elastomer
- 25% by weight of Tuftec® H1062 from Asahi Kasei, Japan/styrene-ethylene/butylene block copolymer
- 30% by weight of Adflex® C290F from LyondellBasell/ heterophasic propylene copolymer
- 25% by weight of Tosoh FY-13 from Tosoh Corp., Japan/ composite composed of ethylene homopolymer (70% to 80% by weight) and ethylene-1-butene copolymer (20% to 30% by weight)/density: 950 kg/m$^3$, $T_m$: 128° C.

The stated formulation was mixed in the melt state in a separate compounding step and granulated for further use.

The melts from the granulated compounds of the first polymer layer (A), the central polymer layer (C) and the second polymer layer (B) were coextruded using process parameters customary for polypropylene (temperature of 180° C. to 230° C.), and a multilayer film was obtained.

The film was made with a total thickness of 350 µm, with the first polymer layer (A) and second polymer layer (B) both having a thickness of 35 µm and the central polymer layer (C) having a thickness of 280 μm. The film produced was sterilized using hot steam.

A medical bag was shaped from two of the multilayer films produced, with the second polymer layer (B) forming the inner face of the bag and the first polymer layer (A) forming the outer face of the bag and two flexible tubes composed of a material as described in Example 1 (outer diameter: 4.1 mm, inner diameter: 2.7 mm) being positioned between the inner faces at the contours of the bag. After that, the inner faces were contacted with one another and with the flexible tubes positioned in between at the contours of the bag and, thereafter, the inner faces were permanently heat-sealed with one another and with the flexible tubes positioned in between at the contours of the bag with the aid of welding tools temperature-adjusted to 134° C. to 142° C.

The bag comprising pieces of flexible tube that is obtained is very highly suitable for the storage of blood plasma at low temperatures of, for example, −65° C.

Example 3 (not According to the Invention)

First Polymer Layer (A): Composition and Preparation as in Example 1
Central Polymer Layer (C):
  10% by weight of Adflex® C290F from LyondellBasell/heterophasic propylene copolymer
  15% by weight of Tuftec® H1062 from Asahi Kasei, Japan/styrene-ethylene/butylene block copolymer
  15% by weight of Engage® 8003 from Dow Chemical Company, USA/ethylene-octene polyolefin elastomer
  60% by weight of Bormed® TD109CF from *Borealis*, Austria/polypropylene terpolymer
The stated formulation was mixed in the melt state in a separate compounding step and granulated for further use.
Second Polymer Layer (B):
  70% by weight of Bormed® TD109CF from *Borealis*, Austria/polypropylene terpolymer
  15% by weight of Tuftec® H1062 from Asahi Kasei, Japan/styrene-ethylene/butylene block copolymer
  15% by weight of Purell® RP270G from LyondellBasell/random ethylene-propylene copolymer
The stated formulation was mixed in the melt state in a separate compounding step and granulated for further use. The melts from the granulated compounds of the first polymer layer (A), the central polymer layer (C) and the second polymer layer (B) were coextruded using process parameters customary for polypropylene (temperature of 180° C. to 230° C.), and a multilayer film was obtained.

The film was made with a total thickness of 350 μm, with the first polymer layer (A) and second polymer layer (B) both having a thickness of 35 μm and the central polymer layer (C) having a thickness of 280 μm. The film produced was sterilized using hot steam.

A medical bag was shaped from two of the multilayer films produced, with the second polymer layer (B) forming the inner face of the bag and the first polymer layer (A) forming the outer face of the bag and two flexible tubes composed of a material as described in Example 1 (outer diameter: 4.1 mm, inner diameter: 2.7 mm) being positioned between the inner faces at the contours of the bag. After that, the inner faces were contacted with one another and with the flexible tubes positioned in between at the contours of the bag and, thereafter, the inner faces were permanently heat-sealed with one another and with the flexible tubes positioned in between at the contours of the bag with the aid of welding tools temperature-adjusted to 134° C. to 142° C.

The invention claimed is:

1. A heat-sterilizable multilayer film, comprising:
   a) a first polymer layer (A) containing at least one polypropylene homopolymer modified with at least one impact modifier;
   b) a second polymer layer (B) containing:
      B1) 15% to 45% by weight of at least one component B1) selected from the group consisting of: polypropylene terpolymers and polyethylene elastomers which are copolymers of ethylene and an alpha-olefin containing 4 to 12 carbon atoms;
      B2) 20% to 30% by weight of at least one styrene block copolymer (SBC) elastomer;
      B3) 20% to 40% by weight of at least one propylene-ethylene (block) copolymer, in which the proportion of the structural units of ethylene is ≥9% by weight;
      B4) 15% to 30% by weight of at least one component B4) selected from the group consisting of polybutene-1 plastomers and polyethylene composites having a melting temperature of >125° C. and a density of 945 to 960 kg/m$^3$; and
   c) a central polymer layer (C) situated between the first polymer layer (A) and the second polymer layer (B), containing:
      C1) 20% to 40% by weight of at least one styrene block copolymer (SBC) elastomer;
      C2) 15% to 30% by weight of at least one polyethylene elastomer which is a copolymer of ethylene with an alpha-olefin containing 4 to 12 carbon atoms;
      C3) 25% to 50% by weight of at least one propylene-ethylene (block) copolymer, in which the proportion of the structural units of ethylene is ≥9% by weight; and
      C4) 0% to 20% by weight of at least one component C4) selected from the group consisting of polypropylene terpolymers, random propylene-ethylene copolymers, and polybutene-1 plastomers.

2. The heat-sterilizable multilayer film of claim 1, wherein the second polymer layer (B) contains:
   B1) 17% to 35% by weight;
   B2) 22% to 28% by weight;
   B3) 25% to 35% by weight; and
   B4) 18% to 28% by weight.

3. The heat-sterilizable multilayer film of claim 1, wherein the second polymer layer (B) contains:
   B1) 19% to 30% by weight;
   B2) 23% to 27% by weight;
   B3) 27% to 33% by weight; and
   B4) 19% to 26% by weight.

4. The heat-sterilizable multilayer film of claim 1, wherein the central polymer layer (C) contains:
   C1) 25% to 40% by weight;
   C2) 18% to 30% by weight;
   C3) 25% to 45% by weight; and
   C4) 1% to 15% by weight.

5. The heat-sterilizable multilayer film of claim 1, wherein the central polymer layer (C) contains:
   C1) 30% to 38% by weight;
   C2) 20% to 28% by weight;
   C3) 25% to 39% by weight; and
   C4) 3% to 12% by weight.

6. The heat-sterilizable multilayer film of claim 1, wherein the polypropylene terpolymer (component B1) and/or C4)) is a terpolymer of propylene, ethylene, and a $C_4$-$C_{12}$-α-olefin.

7. The heat-sterilizable multilayer film of claim 1, wherein the polypropylene terpolymer (component B1) and/or C4)) is a terpolymer of propylene, ethylene, and butylene.

8. The heat-sterilizable multilayer film of claim 1, wherein the polyethylene elastomer (component B1) and/or C2)) is an ethylene-butylene copolymer and/or an ethylene-1-octene copolymer.

9. The heat-sterilizable multilayer film of claim 1, wherein the polyethylene elastomer (component B1) and/or C2)) is an ethylene-1-octene copolymer.

10. The heat-sterilizable multilayer film of claim 1, wherein the styrene block copolymer elastomer (component B2) and/or C1)) is selected from the group consisting of styrene-ethylene-butylene-styrene block copolymer (SEBS), styrene-ethylene-propylene-styrene block copolymer (SEPS), styrene-ethylene-ethylene-propylene-styrene block copolymer (SEEPS), styrene-isoprene-styrene block copolymer (SIS), and styrene-butadiene-styrene block copolymer (SBS).

11. The heat-sterilizable multilayer film of claim 1, wherein the styrene block copolymer elastomer (component B2) and/or C1)) is selected from the group consisting of styrene-ethylene-butylene-styrene block copolymer (SEBS) and styrene-ethylene-propylene-styrene block copolymer (SEPS).

12. The heat-sterilizable multilayer film of claim 1, wherein the styrene block copolymer elastomer (component B2) and/or C1)) is styrene-ethylene-butylene-styrene block copolymer (SEBS).

13. The heat-sterilizable multilayer film of claim 1, wherein the polyethylene composite (component B4)) consists of:
   65% to 85% by weight of ethylene homopolymer, and
   15% to 35% by weight of at least one ethylene copolymer which contains as comonomer at least one alpha-olefin having 4 to 12 carbon atoms.

14. The heat-sterilizable multilayer film of claim 13, wherein the ethylene copolymer is prepared by copolymerization of ethylene and at least one alpha-olefin in the presence of a metallocene catalyst.

15. The heat-sterilizable multilayer film of claim 1, wherein the first polymer layer (A) contains 80% to 95% by weight of a polypropylene homopolymer and 5% to 20% by weight of at least one impact modifier selected from the group consisting of styrene block copolymers and/or polyethylene elastomers.

16. The heat-sterilizable multilayer film of claim 1, wherein the multilayer film consists of the polymer layers (A), (B), and (C), and the total film thickness of the multilayer film is 300 to 450 μm; and
   the layer thickness of the first polymer layer (A) is 5% to 15% by weight;
   the layer thickness of the second polymer layer (B) is 5% to 15% by weight; and
   the layer thickness of the central polymer layer (C) is 70% to 85% by weight.

17. A method for producing the heat-sterilizable multilayer film of claim 1, wherein the first polymer layer (A), the central polymer layer (C), and the second polymer layer (B) are coextruded.

18. A medical container, with or without welded-on port elements and/or flexible tubes, for medical solutions, blood plasma, cells, or organic tissue, comprising the heat-sterilizable multilayer film of claim 1.

19. A method for producing a medical container, with or without welded-on port elements and/or flexible tubes, for medical solutions, blood plasma, cells, or organic tissue, comprising the steps of:
   a) providing at least one heat-sterilizable multilayer film of claim 1;
   b) optionally providing one or more port elements and/or flexible tubes;
   c) shaping the medical container from the at least one heat-sterilizable multilayer film, such that the second polymer layer (B) forms the inner face of the medical container and the first polymer layer (A) forms the outer face of the medical container;
   d) optionally positioning the port elements and/or flexible tubes between the inner faces at the contours of the medical container;
   e) contacting the inner faces with one another and with port elements and/or flexible tubes optionally positioned in between at the contours of the medical container; and
   f) heat-sealing the inner faces with one another and with port elements and/or flexible tubes optionally positioned in between at the contours of the medical container.

20. The medical container of claim 18, wherein the port elements and/or flexible tubes are a multilayer flexible tube containing:
   x) a first polymer layer (X) containing at least one random propylene-ethylene copolymer and/or polypropylene terpolymer modified with at least one impact modifier;
   y) a second polymer layer (Y) containing:
      Y1) 20% to 50% by weight of at least one polypropylene terpolymer and/or random propylene-ethylene copolymer;
      Y2) 20% to 50% by weight of at least one styrene block copolymer (SBC) elastomer; and
      Y3) 10% to 50% by weight of at least one polyethylene elastomer which is a copolymer of ethylene with an alpha-olefin containing 4 to 12 carbon atoms and/or is a copolymer of ethylene and a carbonyl compound; and
   z) a central polymer layer (Z) situated between the first polymer layer (X) and the second polymer layer (Y), wherein the central polymer layer (Z) contains:
      Z1) 30% to 70% by weight of at least one impact modifier selected from the group consisting of styrene block copolymers, and/or polyethylene elastomers; and
      Z2) 30% to 70% by weight of at least one polypropylene terpolymer and/or random propylene-ethylene copolymer.

* * * * *